July 13, 1926.

M. SMOLENSKY

VALVE

Filed Dec. 26, 1924

INVENTOR.
Michael Smolensky
BY John A. Bommhardt
ATTORNEY.

July 13, 1926.
M. SMOLENSKY
VALVE
Filed Dec. 26, 1924
1,592,471
2 Sheets-Sheet 2
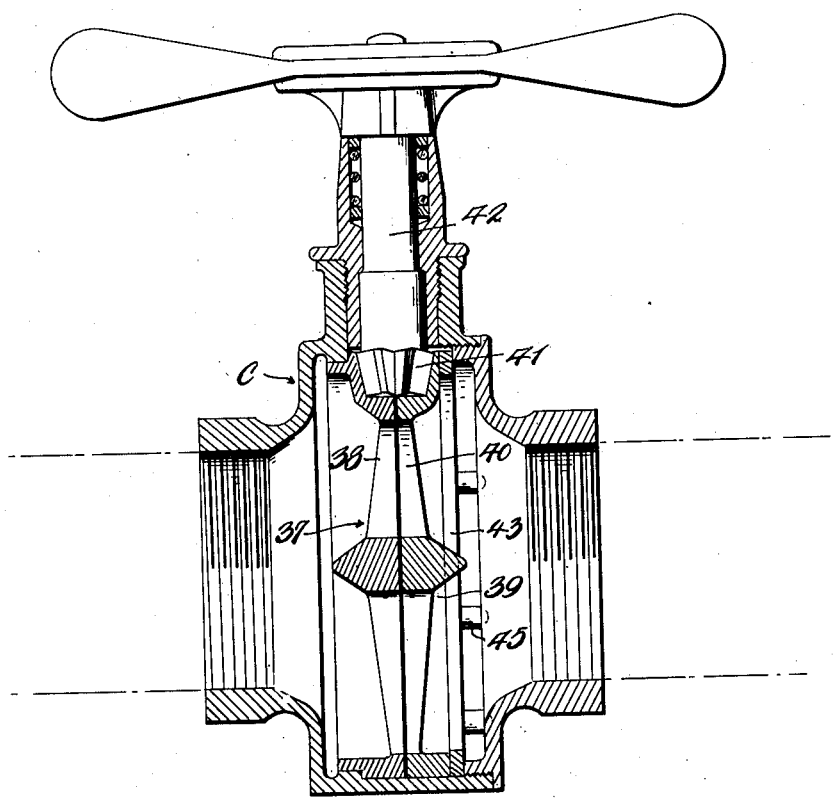
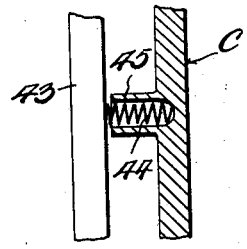
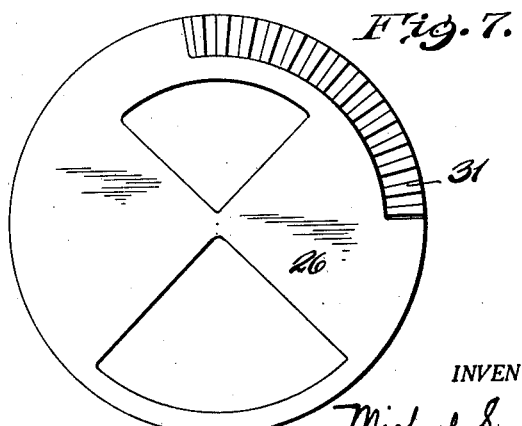
INVENTOR.
Michael Smolensky
BY John A. Bornhardt
ATTORNEY.

Patented July 13, 1926.

1,592,471

UNITED STATES PATENT OFFICE.

MICHAEL SMOLENSKY, OF CLEVELAND, OHIO.

VALVE.

Application filed December 26, 1924. Serial No. 758,278.

This invention relates to improvements in valves having for an object the provision of a self grinding packless valve in which the usual water hammer is eliminated.

Another object is to provide a valve having means to insure snug relative engagement of the valve plates at all times, this means also serving to regrind the contacting valve plate faces.

It is likewise an object to construct a valve of this type in which the elements may be easily removed when necessary.

Other objects will be in part obvious and in part pointed out hereinafter.

In order that the invention and its mode of operation may be readily understood by persons skilled in the art, I have in the accompanying illustrative drawings, and in the following detailed description based thereon set out a preferred embodiment and a modification thereof.

Figure 5 is a vertical longitudinal sectional view of a modification;

Figure 6 is a detail of the expansion coil spring arrangement associated with the valve plates; and Figure 7 is a face view of the movable valve plate.

Figure 1:
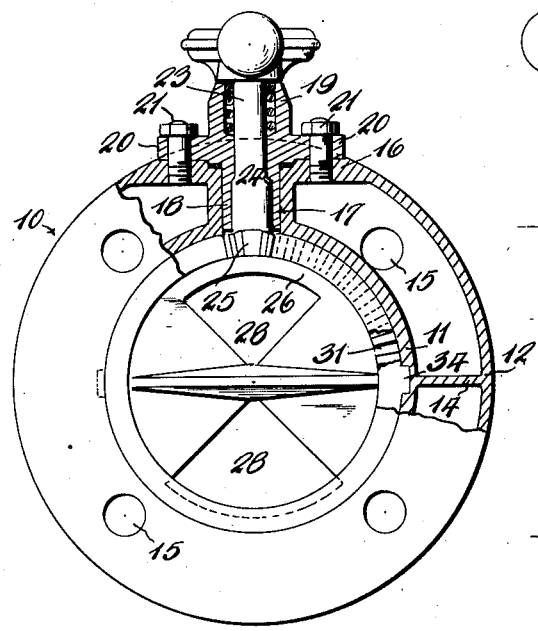
Figure 1 is a face view of a valve constructed in accordance with my invention, parts being shown in section.

In the preferred form of this valve is included a hollow shell or valve housing 10 including a pair of radially spaced circumferential inner and outer walls 11 and 12 respectively, said walls 11 and 12 being integrally formed with end walls 13 and reinforcing webs or ribs 14. The end walls have bolt openings 15 which are designed for alinement with similar openings in flanges F of pipe sections which are connected as illustrated. The outer wall 12 of the housing is thickened and channeled as at 16 and provided with an opening 17 which communicates with the interior of the housing through a sleeve 18 as shown in Figure 1 of the drawings.

A bonnet 19 is arranged in the channel of the thickened portion 16 and carries a pair of oppositely directed ears 20 which are apertured to receive bolts 21 which secure the bonnet to the valve housing. A neck portion carried by the bonnet is snugly fitted into the sleeve 18 formed in the valve housing. A spindle or valve operating stem 23 is arranged in the sleeve and a passageway formed in the upper portion of the bonnet, and is provided intermediate its ends with a shoulder 24 engageable as shown with an annular shoulder formed upon the inner face of the sleeve 18. The upper end of this spindle or valve operating stem 23 is connected to an operating handle which may be of any usual construction but is preferably formed to include a pair of diametrically oppositely disposed hand pieces. The relation of the valve plates and hand pieces is such that when the valve is opened to allow passage of fluid therethrough the hand pieces are longitudinally alined with the direction of the fluid flow.

Figure 2:
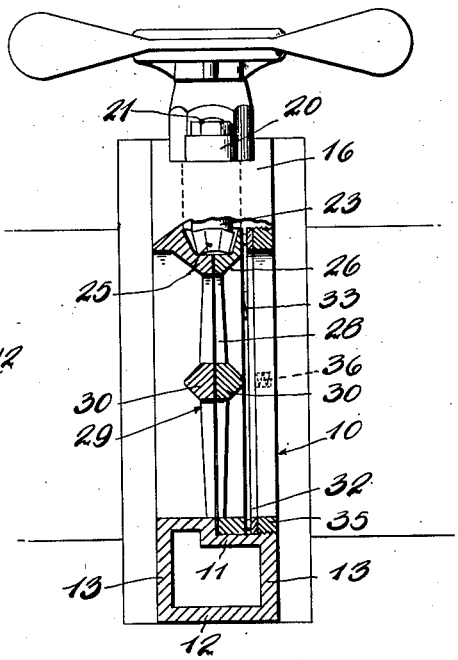
Figure 2 is an edge elevation partly in section.
Figure 3:
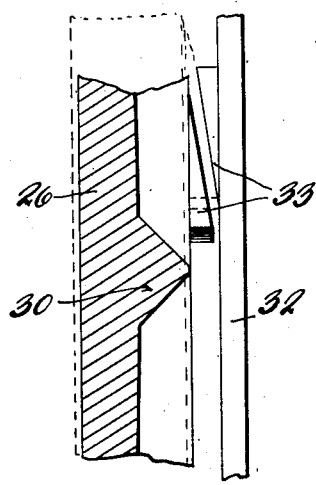
Figure 3 is a detail of the cam device.
Figure 8:
Figure 8 shows the pinion gear.
Figure 4:
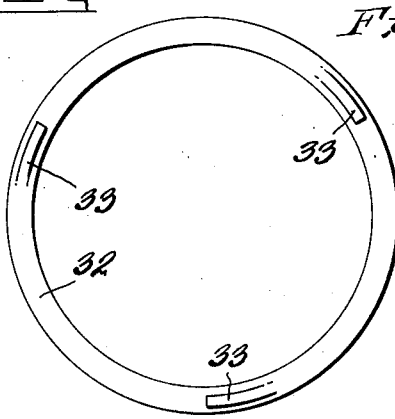
Figure 4 is a face view of the cam carrying ring.

Fixed to the enlarged end of the stem 23 is a beveled pinion gear 25 which is designed to move the axially rotatable valve plate 26, to aline the openings formed therein with similarly shaped and sized openings 28 formed in the fixed valve plate 29, as shown in Figure 2 of the drawings. Each of these valve plates 26 and 29 is provided with reinforcing webs or ribs 30 for obvious reasons. These webs or ribs are tapered in such a manner as to offer a minimum amount of resistance to the passage of fluid through the valve. These ribs are thickened in the center and decreased in area toward the disk peripheries so as to form disks having uniform strength over the entire area whereby buckling of the disks under pressure is eliminated. Weakness of the central portions of valve disks results in separation under pressure of steam or water in a pipe-line and consequent leakage.

The movable valve plate 26 is provided with gear teeth 31 about one fourth of its circumference and upon the inner face thereof as shown in Figure 2. These teeth are designed to mesh with the teeth of a three-toothed gear 25 so that upon rotation of said pinion gear the movable valve plate will be axially rotated to vary the size of the passages through which fluid may flow.

A three-toothed pinion gear has been found most efficient in effecting rotation of the movable valve plate, particularly where there is great pressure against the plate, a greater or lesser number of teeth being totally unsatisfactory.

In order to provide snug relative engagement of the fixed and movable valve plates and provide for self grinding of the contacting faces, I arrange adjacent the outer face of the movable plate 26 a ring 32, this ring and adjacent face of the valve plate carrying co-acting cams 33. When the valve plates are so relatively arranged as to close the passage ways 27 and 28, the cams are engaging one another and the result is that the movable valve plate 26 is pressed into close contact with the fixed plate 29. Obviously this structure provides a seating such as will eliminate the necessity of using packing as in the ordinary valve and further will automatically regrind the contacting faces with every operation of the valve. This re-grinding obviously maintains perfectly smooth contacting faces such as will positively prevent leakage of fluid through or past the valve.

This cam carrying ring 32 is provided at diametrically opposed points with lugs 34 which extend into sockets formed in the inner wall 11 of the valve housing to prevent axial rotation of the ring, it being obvious that such rotation would prevent operation of the cams 33 as above stated. A locking ring 35 is threaded into the housing to retain the cam carrying ring 32 in substantially the position illustrated in Figure 2 of the drawings. Through arrangement of this locking ring the cam carrying ring 32 may be easily replaced, should the cams 33 become worn.

In order to make further provision for positive engagement of the two plates I provide expansion coil springs 36 whose outer ends engage the cam carrying ring 32, the result being that the cams 33 will inter-engage upon partial axial rotation of the movable valve plate 26.

Through the use of a valve constructed as herein set forth the usual water hammer is eliminated, this feature in the ordinary valve causing crumbling of the valve disks or plates, and many other undesired results. The arrangement of a cam carrying ring by means of which vibration of the rotatable or movable plate is prevented serves to eliminate the above mentioned objection to the ordinary valve.

In a modified form of the valve construction I provide a separately formed valve plate 37 which is fixed within the valve casing and is provided with a pair of openings 38 through which fluid may pass. A movable valve plate 39 constructed substantially as shown in Figure 5 is arranged to co-act with the fixed valve plate and also includes openings 40 which at times may be alined with the openings to permit passage of fluid through the valve. The movable valve plate is provided with gear teeth about one fourth its circumference as in the preferred form, these teeth being meshed with a small beveled pinion gear 41.

A valve stem or spindle 42 is arranged as illustrated, carrying the pinion gear 41, the two elements being rotatable as a unit by means of the handle as shown.

In order to provide for snug engagement of the adjacent faces of the valve plates I arrange in contact with the outer face of the movable valve plate, a ring 43 which is designed to exert pressure on said movable plate due to the arrangement of a set of coil springs 44 as shown in Figure 6. These coil springs 44 are arranged in short hollow necks or sleeves 45 which are integrally formed with the valve casing C. It is obvious that the tendency of these springs to expand will press the ring 43 against the movable valve plate and consequently provide snug relative engagement between said valve plates and further provide for re-grinding of the contacting faces with each and every operation of the valve.

It is quite obvious that through a comparatively slight modification, valves embodying the principle herein employed may be easily applied in lieu of the usual radiator valve.

Manifestly, the construction shown is capable of considerable modification and such modification as may fall within the scope of my claims, I consider within the spirit of my invention.

I claim:

1. In a valve comprising a collar like body having a longitudinal and a radial opening, an operating stem extending through the radial opening, a three toothed pinion gear on the inner end of the stem, a transverse wall having a pair of opposed openings and one smooth face to form a seat, a partially rotatable valve disk having contact with said smooth face, said disk having opposed openings alineable at times with the other openings and having a portion of its periphery provided with a channel, gear teeth in the channel meshed with said pinion gear, circumferentially spaced cams on the outer face of the movable disk, a follower ring having cams engageable with the first named cams, and a locking collar threaded into the longitudinal opening against the follower ring, said longitudinal opening being of an area to permit removal of the rotatable disk and follower ring therethrough.

2. A valve comprising a collar like body having a longitudinal and a radial opening, an operating stem extending through the radial opening, a three toothed pinion gear on the inner end of the stem, a transverse wall having a pair of opposed openings and one smooth face to form a seat, a partially rotatable valve disk having contact with said smooth face, said disk having opposed openings alineable at times with the other openings and having a portion of its periphery provided with a channel, a diametrically arranged rib integrally formed upon the outer face of both the transverse wall and the valve disk, said ribs being tapered toward their outer ends to uniformly strengthen the wall and disk, gear teeth in the channel meshed with said pinion gear, circumferentially spaced cams on the outer face of the movable disk, a follower ring having cams engageable with the first named cams, and a locking collar threaded into the longitudinal opening against the follower ring, said longitudinal opening being of an area to permit removal of the rotatable disk and follower ring therethrough.

3. A valve comprising a housing having a passageway therethrough, a wall extending across the passageway and provided with opposed openings, a floating rotatable valve disk slidably engaging one face of said wall and having openings alineable at times with those in said wall, ribs on the outer faces of said wall and valve disk, said ribs being tapered toward their outer ends to uniformly strengthen the wall and disk, said disk having a relatively short channel in its periphery, gear teeth in said channel, a pinion engaging said gear teeth to effect rotation of the valve disk, cam means for effecting leak proof contact between the valve disk and wall, and a locking collar threaded into said passageway and removable at times to permit separation of the valve disk and cam means.

In testimony whereof, I do affix my signature.

MICHAEL SMOLENSKY.